Dec. 23, 1930.  M. G. ZOELLER  1,786,049
STOCK WATERER
Filed July 12, 1929
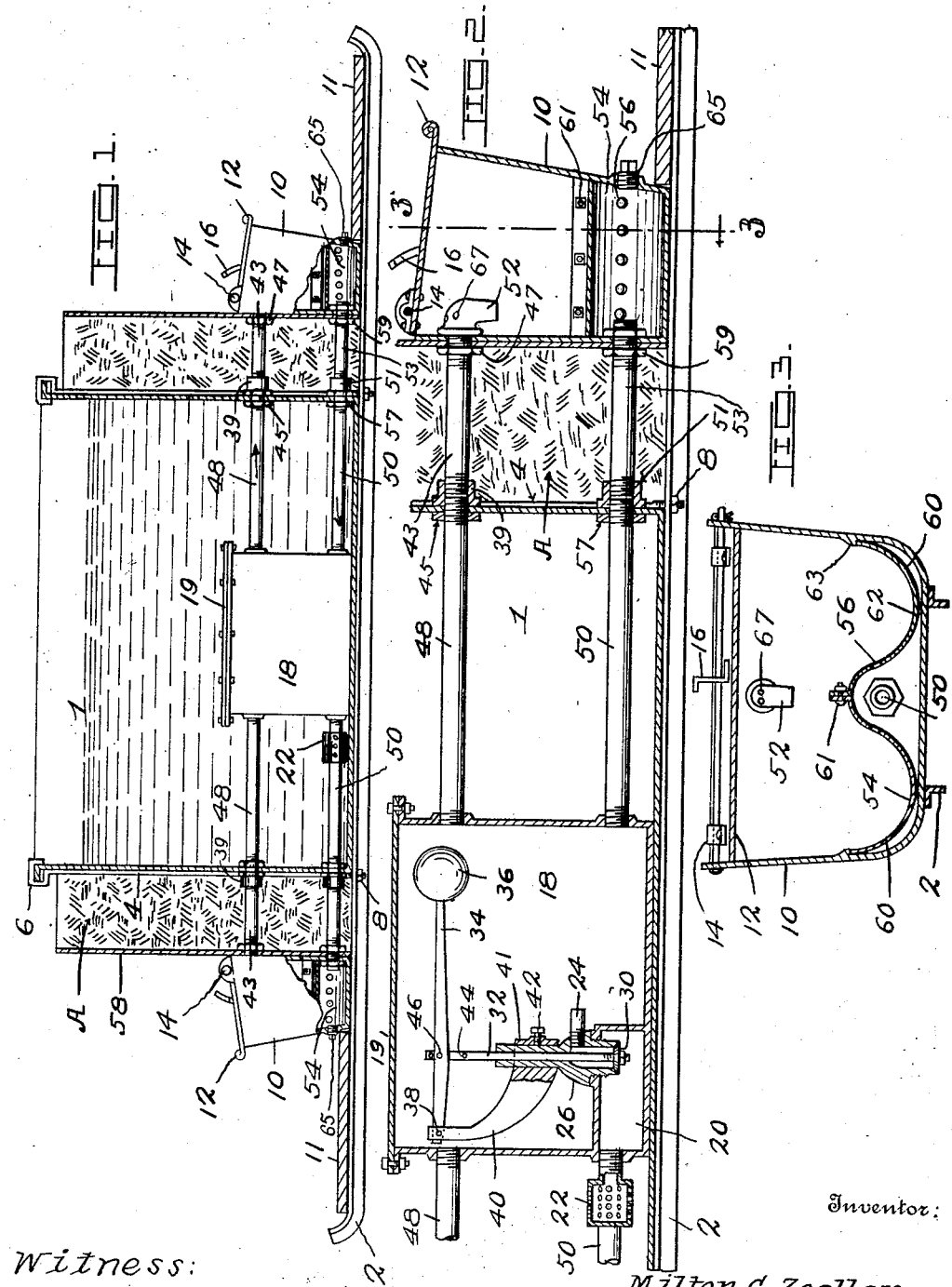
Witness:
Fred C. Fischer.
Inventor:
Milton G. Zoeller,
By
F. G. Fischer,
Attorney Patented Dec. 23, 1930

1,786,049

UNITED STATES PATENT OFFICE

MILTON G. ZOELLER, OF FALLS CITY, NEBRASKA

STOCK WATERER

Application filed July 12, 1929. Serial No. 377,699.

My invention relates to watering apparatus embodying means whereby hogs and smaller animals can obtain water as well as cattle and other stock, and one object is to provide a portable apparatus of this character which can be moved from one lot or field to another and thus be kept on clean ground and amid sanitary surroundings.

A further object is to provide novel means for preventing the water in the drinking troughs from freezing and which will maintain the water in good drinking condition during cold weather.

Another object is to provide means for preventing the drinking water from becoming contaminated with refuse likely to injure the health of the animals.

Other objects will hereinafter appear and in order that the invention may be fully understood, reference will now be had to the accompanying drawings, in which:

Fig. 1 is a central vertical section of the apparatus with some of the parts in elevation.

Fig. 2 is an enlarged broken central section of certain parts of the apparatus.

Fig. 3 is a vertical cross section of one of the drinking troughs on line 3—3 of Fig. 2.

Referring in detail to the different parts, 1 designates a main tank from which cattle and large animals may drink. Said tank is mounted upon a pair of skids 2 so that it may be readily hauled from one place to another. Any suitable means may be employed for securing the tank 1 upon the skids 2. In the present instance I have shown such means consisting of rods 4 having hook-shaped upper ends 6 which engage over the upper margin of the tank 1, while their lower ends extend through the skids 2 to which they are secured by suitable means such as nuts 8.

10 designates drinking troughs from which hogs and smaller animals may drink. Any suitable number of troughs may be employed, but in the present instance I have shown two located at opposite sides of the tank 1. Planks 11 are placed upon the skids 2 in front of the troughs 10 for the hogs to stand upon so that they can readily gain access to the water in each trough. The troughs 10 may be placed directly against the outer surface of the tank 1, or spaced a short distance from opposite sides of said tank as shown by Figs. 1 and 2. The troughs 10 are mounted upon the skids 2 so that they can be moved as a unit with the tank 1. Refuse and other foreign matter likely to contaminate the water in the troughs 10 is excluded by means of self-closing lids 12 which the hogs soon learn to open when desiring a drink. The lids 12 are mounted upon hinges 14 and have stops 16 to limit their opening movement so that they will automatically close after being opened.

18 designates an auxiliary tank which is preferably located within the lower central portion of the main tank 1 where it is not likely to be damaged by the livestock or freeze in cold weather. The auxiliary tank 18 is provided with an air-tight lid 19 which is removable so that access may be had to the valve mechanism 26 located within said auxiliary tank.

An intake chamber 20 is formed in the lower portion of the auxiliary tank 18 and provided with a screened inlet pipe 22 through which the water enters from the lower portion of the main tank 1 and flows into said auxiliary tank 18 through the outlet pipe 24 of the valve mechanism 26. The valve mechanism 26 is secured upon the chamber 20 and provided with a valve plug 30 mounted upon the lower end of a valve stem 32 which extends upwardly through the valve casing and has a lever 34 equipped at one end with a float 36 and mounted at its opposite end upon a fulcrum 38.

The fulcrum 38 is mounted upon the upper end of a bracket 40 which is provided with a sleeve 41 adjustably mounted upon the valve casing and secured at any point of its adjustment by suitable means such as a set screw 42. The valve stem 32 has a series of holes 44 any one of which is adapted to receive a pivot 46 whereby the lever 34 is connected to said valve stem 32. The adjustable bracket 40 and the pivot 46 enable the lever 34 and the float 36 to be raised or lowered for the purpose of changing the level of the water in the auxiliary tank 18 if desired.

48 designates pipes extending from the upper portion of the auxiliary tank 18 through openings in the wall of the main tank 1. The pipes 48 are connected by couplings 39 to short pipes 43 extending into the upper portions of the troughs 10 and provided with downturned nozzles 52. Lock nuts 45 and 47 are provided to cooperate with the couplings 39 and nozzles 52 in forming leak-proof joints where the pipes 48 and 43 extend through the wall of the tank 1 and the troughs 10, respectively.

50 designates pipes extending from the lower portion of the auxiliary tank 18 through openings in the wall of the main tank 1 and connected by couplings 51 to short pipes 53 extending into the lower portions of the troughs 10, the walls of which latter have clean-out openings in axial alinement with the pipes 50 and 53, so that any sediment which has accumulated within said pipes may be removed with a rod or other instrument. The clean-out openings are normally closed with plugs 65 to prevent the water in the troughs 10 from running out. The pipes 50 are provided with lock nuts 57 which cooperate with the couplings 51 in forming leak-proof joints where said pipes 50 extend through the wall of the tank 1. The short pipes 53 are provided with lock nuts 59 which assist in securing them in place and form leak-proof joints where said pipes 53 extend through the walls of the troughs 10.

The lower portions of the troughs 10 are equipped with false bottoms 54 for preventing mud and other refuse matter from collecting in the bottoms of said troughs and clogging the short pipes 53. Each false bottom 54 consists of two sections 60 connected by bolts 61 and curved downwardly at their central portions 62 which rest upon the bottoms of the respective troughs 10, so that hogs can drink even after the water gets low in said troughs. Lugs 63 on the sides of the troughs overlap the upper margins of the false bottoms 54 and serve to hold the latter in place. The false bottoms 54 have perforations 56 for establishing communications between the troughs 10 and the pipes 53.

During the winter months the main tank 1 is surrounded by a wall A of fresh stable manure held in place with a suitable retaining wall 58. The wall A, together with the natural warmth of the ground upon which the tank 1 rests, prevents the water from freezing in cold weather and sets up a circulation between the auxiliary tank 18 and the troughs 10 on the well known principle of the thermosiphon, the water flowing through the pipes 48, 43 and the nozzles 52 to the troughs 10 and back to the tank 1 through the pipes 53 and 50. In the event that a mechanical heater is employed in lieu of the wall A, the retaining wall 58 and the short pipes 43 and 53 may be dispensed with, in which case the troughs 10 are placed against the wall of the tank 1 and connected directly to the pipes 48 and 50.

In warm weather when the temperature of the water in the troughs 10 and the auxiliary tank 18 is approximately equal, so that no thermosiphon action takes place, the water used from the troughs 10 from time to time by the hogs is automatically replaced by water which flows from the auxiliary tank 18 through the pipes 50 and 53 into the troughs 10 until the water in the latter reaches the same level as that within the auxiliary tank 18, which is approximately on a level with the pipes 48 and 43. As the water flows from the auxiliary tank 18 it is replaced with air which enters through perforations 67 in the nozzles 52, and flows into the tank 18 through the pipes 43 and 48, so that there will be no danger of the auxiliary tank 18 becoming air-locked and thereby preventing the free flow of water to the troughs 10.

From the foregoing description it is apparent that I have provided an apparatus embodying the advantages above pointed out, and while I have shown and described one form of the invention I reserve all rights to such changes and modifications as properly fall within the spirit and scope of the invention as claimed.

Having thus described my invention, what I claim and desire to secure by Letters Patent is:

1. A portable watering apparatus of the character described consisting of a main tank, a trough located close to said tank, an auxiliary tank located within said main tank, an inlet chamber in said auxiliary tank, a float-controlled valve for admitting water from said inlet chamber to the auxiliary tank, and pipe connections between the trough and said auxiliary tank.

2. In a watering apparatus of the character described, a trough, a perforated false bottom in said trough consisting of two curved sections bolted together, and lugs on the trough for holding said false bottom in place.

3. In a watering apparatus of the character described, an auxiliary tank having an inlet chamber, a valve for controlling the flow of water from the inlet chamber into said auxiliary tank, a lever provided with a float for controlling said valve, and a bracket carrying said lever and which is rotatably and vertically adjustable upon the valve casing.

4. Watering apparatus consisting of a main tank, an auxiliary tank located in the lower portion of said main tank, means for automatically admitting water from the main tank to said auxiliary tank, a trough located a short distance from the main tank to leave a space for heating material placed around said tank, and pipes extending from the upper and lower portions of the auxiliary tank to said trough.

5. Watering apparatus consisting of a main tank, an auxiliary tank located in the lower portion of said main tank, means for automatically admitting water from the main tank to said auxiliary tank, troughs located a short distance from the main tank to leave a space for heating material placed around said tank, pipes extending from the upper and lower portions of the auxiliary tank to the troughs, downturned nozzles in said troughs and connected to the upper pipes, clean-out openings in the walls of the troughs and in axial alinement with said lower pipes, and plugs for closing said clean-out openings.

In testimony whereof I affix my signature.

MILTON G. ZOELLER.